(12) United States Patent
Kuklinski

(10) Patent No.: US 7,283,424 B1
(45) Date of Patent: Oct. 16, 2007

(54) HIGH SPEED UNDERWATER PROJECTILE TRACKING SYSTEM AND METHOD

(75) Inventor: Robert Kuklinski, Portsmouth, RI (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/499,973

(22) Filed: Aug. 2, 2006

(51) Int. Cl.
*G01S 3/802* (2006.01)
(52) U.S. Cl. ...................................... 367/118
(58) Field of Classification Search ................ 367/118, 367/124, 5, 129
See application file for complete search history.

(56) References Cited

U.S. PATENT DOCUMENTS 3,251,024 A * 5/1966 Farmer .......................... 367/4
3,824,463 A * 7/1974 Oehler ........................ 324/179
5,033,034 A * 7/1991 Paradise ..................... 367/124
5,377,162 A * 12/1994 Jestin et al. ................. 367/124
6,198,694 B1 * 3/2001 Kroling et al. ............. 367/127
6,467,342 B1 * 10/2002 Gieseke ....................... 324/178
6,563,302 B1 * 5/2003 Raposa et al. .............. 324/179

* cited by examiner

*Primary Examiner*—Daniel Pihulic
(74) *Attorney, Agent, or Firm*—James M. Kasischke; Michael P. Stanley; Jean-Paul A. Nasser

(57) ABSTRACT

A system and a method are provided to accurately track the trajectory of high-speed underwater objects. A number of hoops with means for controlling the buoyancy thereof are aligned on a range in the anticipated path of the high speed projectile. The hoops are sufficiently large relative to the size of the projectile and anticipated path. Each hoop contains a number of independent hydrophones. The signals from the hydrophones may be analyzed to accurately determine position and track of an underwater projectile along the plane of each hoop. The system may be used as a fixed range or as a mobile range in a remote location.

12 Claims, 3 Drawing Sheets

HIGH SPEED UNDERWATER PROJECTILE TRACKING SYSTEM AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to tracking systems and, more particularly, to tracking systems and methods for tracking the trajectory and velocity of underwater objects traveling at high speeds.

(2) Description of the Prior Art

The tracking of a high speed (near or above sonic in the water, e.g., in the range of 900 m/sec) underwater projectile with conventional acoustic range systems is impractical. Moreover, the high-speed projectile in relation to the acoustic propagation from the test body creates great difficulty in accurately determining the position from which the acoustic radiation originated.

The following U.S. Patents describe various prior art systems that may be related to projectile tracking or detection systems generally:

U.S. Pat. No. 3,824,463, issued Jul. 16, 1974, to Oehler, discloses a shot cluster velocity measuring apparatus in which the coils through which the shot is to sequentially pass are mounted in axially spaced relation and are electrically connected as frequency determining elements in a high frequency oscillator, the output of which is frequency modulated as the shot cluster passes the coils. An FM discriminator generates an amplitude varying signal representative of the frequency modulation. A differentiating and filtering circuit shapes the discriminator output which is then amplified. The gain of a variable gain amplifier is automatically adjusted to equalize signal amplitude, and a Schmitt trigger produces rectangular pulses. If the pulses out of the trigger are of sufficient duration, they are used to produce "start" and "stop" signals, indicating the passage of the center of mass of the projectile or projectile cluster through the first and second coils, respectively. These signals are then used to control an interval timer which displays the count as a measure of velocity.

U.S. Pat. No. 6,198,694, issued Mar. 6, 2001, to Kroling et al, discloses a method and a device for deciding relative to a chosen reference system, and without contact, the position, direction or speed—or any combination thereof— for a projectile in its flight through a gas towards a given target, the position of the projectile in a first plane that is determined at a certain distance from the target by means of at least three acoustic sensors arranged in a vicinity of the plane. Acoustic sound waves, emanating from a turbulent gas volume extending essentially straight behind the projectile, and/or emanating from a wake or monopole existing essentially straight behind the projectile, are received by means of the acoustic sensors. Time differences for the arrival of the acoustic sound waves to the respective acoustic sensors are measured. The projectile position (x, y; x1, y1) in the first plane is calculated from the time differences. The hit point of the projectile in a target plane through the target is decided with the help of the calculated projectile position in the first plane.

U.S. Pat. No. 6,467,342, issued Oct. 22, 2002, to Gieseke, discloses an apparatus for measuring velocity of a projectile that includes a plurality of break-screens aligned with each other serially and along a line of travel of the projectile, and parallel to each other, and spaced from each other and from a projectile firing device by selected distances. Each break-screen includes a support sheet and an electrically conductive wire mounted on the sheet so as to be interrupted by passage of the projectile through the sheet. A single amplifier is in communication with each of the conductive wires and is adapted to provide an indication as to a change in voltage in each of the break-screens upon passage of the projectile therethrough, and an indication as to time of the passage. A data collection/display apparatus computes therefrom the velocity of the projectile.

U.S. Pat. No. 6,563,302, issued May 13, 2003, to Raposa et al, discloses a device for sensing projectile velocity in an underwater environment. The device includes a plurality of evenly spaced voltage coil members positioned in the path of a projectile. Each voltage coil member includes a support frame having an opening therein and a magnetic coil mounted on the support frame, and a sensing member connected to each support frame. The sensing member includes means for outputting a signal responsive to passage of the projectile through the voltage coil member, and a logic arrangement for determining a difference between passage of the projectile between adjacent ones of said plurality of voltage coil members throughout the run thereof, thereby determining a velocity of the projectile.

For the most part, the above art is not related to tracking underwater high speed objects. The art for underwater high speed objects appears to be limited to measuring the speed of relatively small metallic objects which travel relatively closely to a magnetic pickup. It would be desirable to provide means for determining the trajectory of such objects as well for measuring the speed and/or velocity and/or trajectory of much larger objects. Consequently, those skilled in the art will appreciate the present invention that addresses the above and other problems.

SUMMARY OF THE INVENTION

It is a general purpose of the present invention to provide a system and method to measure the velocity and/or trajectory of an underwater object moving through the water at near supersonic or supersonic speeds.

An object of the present invention is provide a system as described above which is transportable and which may be utilized to create a range of adjustable lengths and operate at variable depths.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention comprises a system for tracking an underwater object traveling at high speed which is defined as being above 300 m/sec. The speed of sound under water is greater than 1481 m/sec, and this invention can track objects traveling faster than this speed. In one embodiment, the invention may comprise a plurality of support structures suitable to be positioned in water and aligned with a roughly projected trajectory of the underwater object. A plurality of acoustic receivers, such as omnidirectional hydrophones, may be carried by each of the plurality of support structures. A data flow path may be provided for transferring data produced by the plurality of acoustic receivers to at least one processor.

If desired, each support structure may be in the form of an open or closed hoop and may further comprise a buoyancy adjustment mechanism to permit vertical positioning in the water. The buoyancy adjustment mechanism may further comprise a tilt adjustment for each respective hoop. Each hoop may comprise a diameter from ten to one hundred feet or more.

The processor may be used for analyzing the data to determine the trajectory and/or velocity of the underwater object. In one embodiment, the processor is operable for detecting an acoustic signal characteristic to determine a time at which the underwater object traveling at near sonic or supersonic speeds passes through a plane of each of the plurality of hoops. The processor may also be operable for measuring an amplitude or magnitude of the data produced by the plurality of acoustic receivers to determine a y-z position in the plane of each of the plurality of hoops as the underwater object passes therethrough.

In operation, a method is provided for detecting velocity and trajectory of an underwater object traveling through the water at near sonic or supersonic speeds. The method may comprise one or more steps such as, for instance, supporting a plurality of hydrophones in water at a plurality of depths such that the plurality of hydrophones are arranged in the water to extend along at least a portion of an anticipated path of the underwater object. In one embodiment, the depths and/or spacing of the hydrophones along the anticipated path may be selectable.

The method may further comprise producing acoustic signal data with the plurality of hydrophones as the underwater object passes the plurality of hydrophones and utilizing this information to determine the velocity and trajectory of the underwater object traveling at near sonic or supersonic speeds. For instance, the method may further comprise utilizing an amplitude of the acoustic signal data to determine a relative distance between the trajectory of the underwater object and the plurality of hydrophones and/or selecting portions of the acoustic signal data to determine a time at which the underwater object passed each of the plurality of hydrophones.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

The present invention provides methods and apparatus to accurately track the trajectory of high-speed underwater objects such as the Adaptable High Speed Underwater Munitions (AHSUM) projectile and/or other high speed underwater objects such as torpedoes or submarines.

Figure 1:
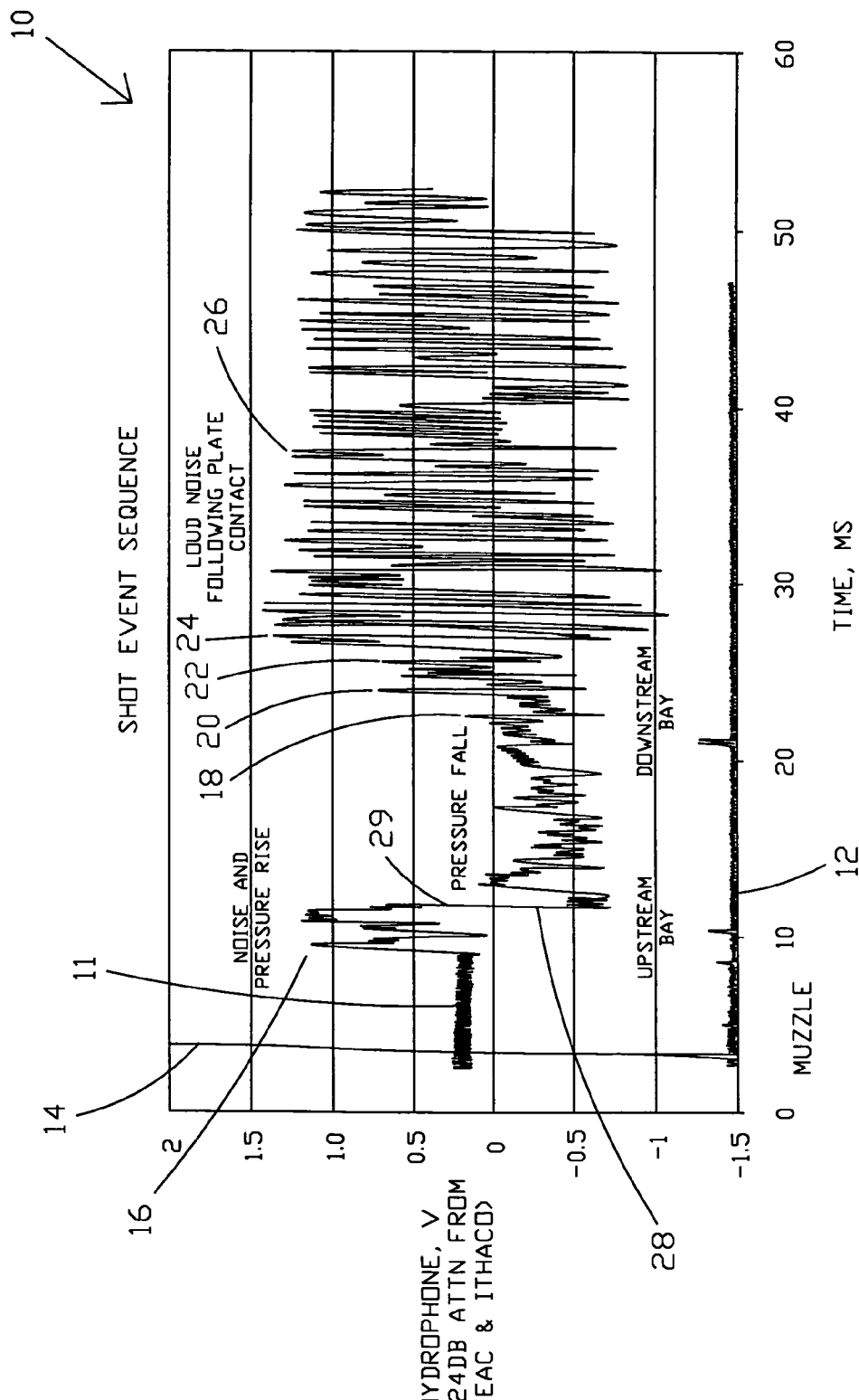
FIG. 1 is a graph showing a representative acoustic magnitude response of a hydrophone with respect to time as a result of a projectile traveling by within about four to five feet of the hydrophone in accord with one possible aspect of the present invention.

Referring now to the drawings and more particularly to FIG. 1, there is shown graph 10 of acoustic response 11 with respect to time. Acoustic response 11 is produced with acoustic data obtained when utilizing an omnidirectional hydrophone during a projectile shot (~900 m/sec). Additional superimposed information is indicated at 12 which may comprise acoustic or vibrational information detected at the muzzle (not shown) used for launching the projectile. Acoustic response 11 may comprise a time series of data related to pressure waves created after the projectile is shot or enters into water in a tank or other body of water.

For the data obtained in FIG. 1, the acoustic receiver was initially spaced downstream from the projectile along its projected trajectory. The first spike 14 (around 4 ms) is the breaking of a muzzle break screen and the entry of the projectile into the tank. Between 8 and 10.2 ms, as indicated by peaks 16, the projectile is in the immediate upstream bay 4-5 feet in front of the hydrophone location. At approximately 23 ms, as indicated at 18, the projectile is at the end of the range and, in this embodiment passes two break screens, as indicated at 20 and 22, before impacting a structure as indicated at 24 that "rings" when struck as indicated generally at 26. The hydrophone response shows repeatable distinct events. Moreover it has been determined that the character of the response is repeatable for different hydrophones.

A large negative pressure excursion, as indicated at 28, follows the large high amplitude spike(s) 16, which in turn is followed by a gradual pressure rise. The transition between large amplitude spike(s) 16 and large negative pressure excursion 28 provides a repeatable means for determining when the projectile passes the plane of the hydrophone. It will be noted that a time frequency plot (not shown) from the same test provides the same clear indication of when the projectile passes the plane of the hydrophone. In either case, in accord with one possible embodiment of the present invention, data from a commercially available acoustic receiver operable in the 1-100 KHz range may be utilized for determining the passage of a projectile. It is further noted that, while this test was conducted utilizing a projectile traveling at about 900 m/sec, this method can be at speeds above 300 m/sec. Below this speed, different equipment and different offset distances would be necessary.

Figure 2:
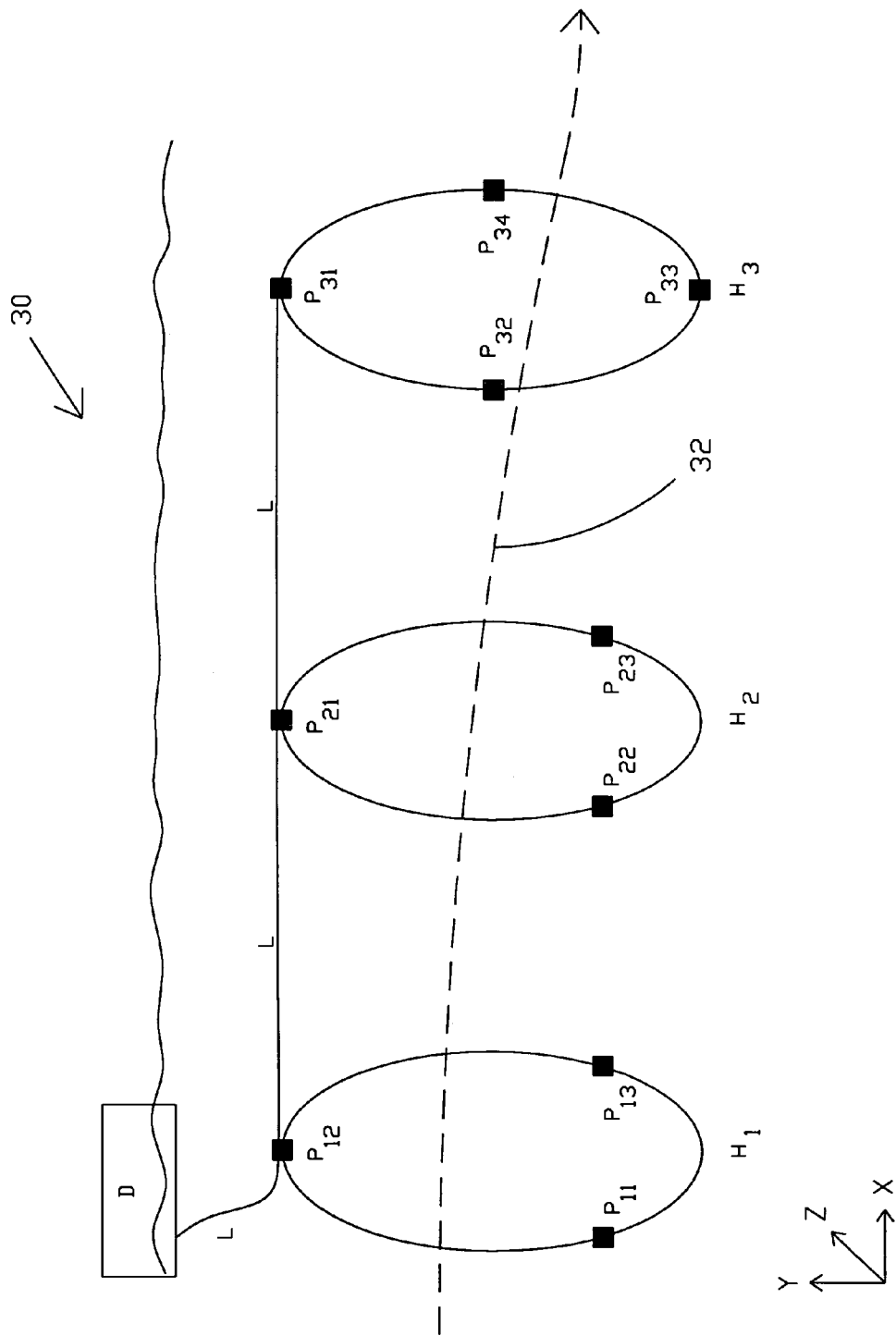
FIG. 2 is a diagrammatic view of an underwater trajectory tracking system wherein the hoops may be in the range of 10-100 feet in diameter and are positioned along an intended tract of a high speed underwater projectile in accord with one possible embodiment of the present invention.

FIG. 2 shows one possible embodiment of underwater projectile range tracking system 30 in accord with the present invention. A series of large hoop structures labeled $H_1$, $H_2$, and $H_3$ (which may preferably be approximately 10-100 ft. in diameter) are positioned along the anticipated or roughly determined path of subsequent actual trajectory 32 of a projectile. It will be understood that additional hoops may be utilized for greater resolution of trajectory 32. Fewer hoops could also be utilized but would result in a lower resolution of the trajectory. Each hoop contains a number of independent omnidirectional hydrophones, e.g., hoop $H_1$ includes hydrophones, $P_{11}$, $P_{12}$, and $P_{13}$; hoop $H_2$ includes hydrophones $P_{21}$, $P_{22}$, and $P_{23}$; and hoop $H_3$ includes hydrophones $P_{31}$, $P_{32}$, $P_{33}$, and $P_{34}$. In one preferred embodiment of the invention, a minimum of at least three hydrophones is supported by each hoop for triangulating the point in the y-z plane of the hoop through which the trajectory passes. More hydrophones in each hoop will provide increased reliability in the case of equipment failure, data discrepancies, or the like.

Each hydrophone may preferably be attached via data link L to a central data collection and storage device and/or processor D that may, if desired, be remotely located. Data link L may or may not also provide means for measuring the distance between the hoops if the distance is variable and/or may or may not comprise struts or other means for affixing the position of the hoops with respect to each other. Other means for maintaining a known distance between the hoops and/or for measuring the distance prior to operation may also be used so that this data is available for processing trajectory 32. For instance, the system may comprise an acoustic transmitter for producing an acoustic calibration pulse or ping that is picked up by the hydrophones for verifying the distance between the hoops.

Data link L may be of many types including cables and/or transponders and/or transceivers and/or links of transponders or transceivers to pass data along the link to a desired location. Many variations for processing data may be utilized. For instance, the data may be stored on the hoop or at the transducer and later transmitted or accessed, perhaps after several quickly carried out sequential tests. Thus, many possible means may be utilized for storing and/or transferring information to one or more storage units and/or processors D. As well, storage units and/or processors D may be of many types and in many locations. For instance, storage units and/or processors D may be located on each hoop or supported at each transducer and may or may not also comprise or control data link L in the form of transponders or the like.

As seen in FIG. 1, as the projectile passes each hoop, the hydrophone signals produced will experience a rapid pressure fall within a millisecond, such as the pressure fall indicated at 28. The pressure fall will indicate the position of the projectile along the range in the x direction at a given time. For instance, a selected transition point 29 between positive peaks 16 and the negative portion of transition 28 or other suitable points on the waveform may be used. It may be desirable to consistently utilize a particular point from each waveform of each hydrophone for this purpose. Examination of the position of the projectile at the different hoops will allow determination of the velocity and position of the projectile along the range. For instance, as the projectile passes the plane of each hoop, the projectile may be at different offset distances from the hydrophones, e.g., distances $D_1$, $D_2$, and $D_3$, shown in FIG. 3A. The amplitudes of the high and low pressure spikes 16 and 28 as the projectile passes, examples of which are shown at 16 and 28 in FIG. 1, correlate to the offset distances $D_1$, $D_2$, and $D_3$ thus allowing resolution of projectile position in the z-y plane. The position or track of the projectile may then be determined in a three dimensional framework (this is true even if the projectile passes outside the hoop, but will be less accurate in that case).

Figure 3A:
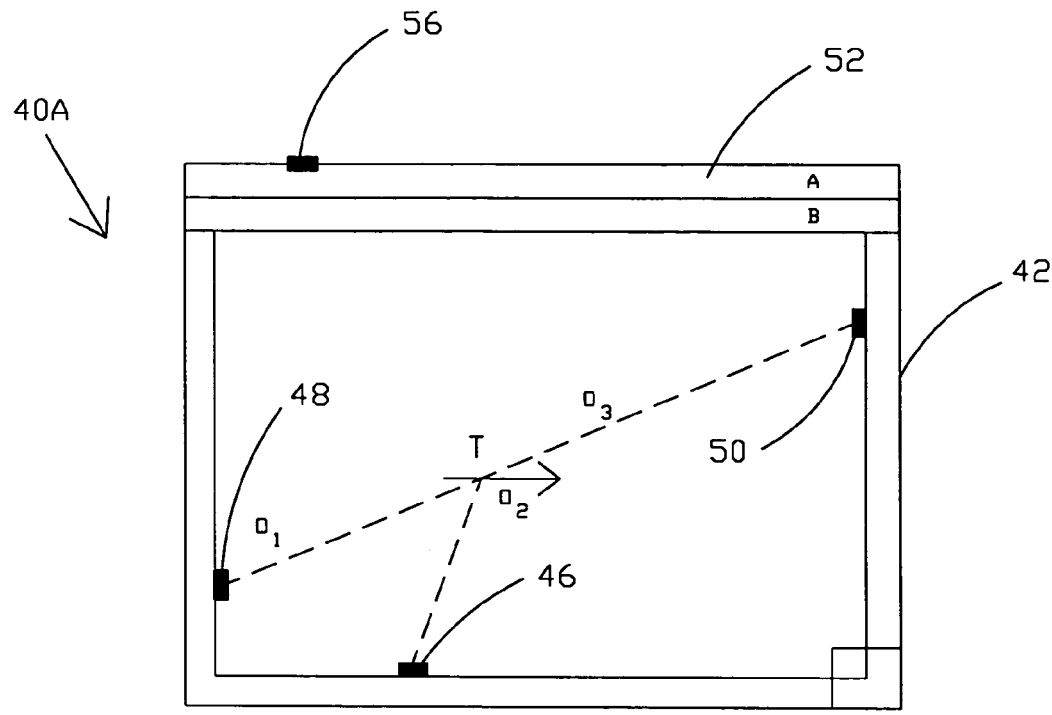
FIG. 3A is an elevational diagram of one possible embodiment of an underwater hoop with adjustable buoyancy in accord with the present invention.
Figure 3B:
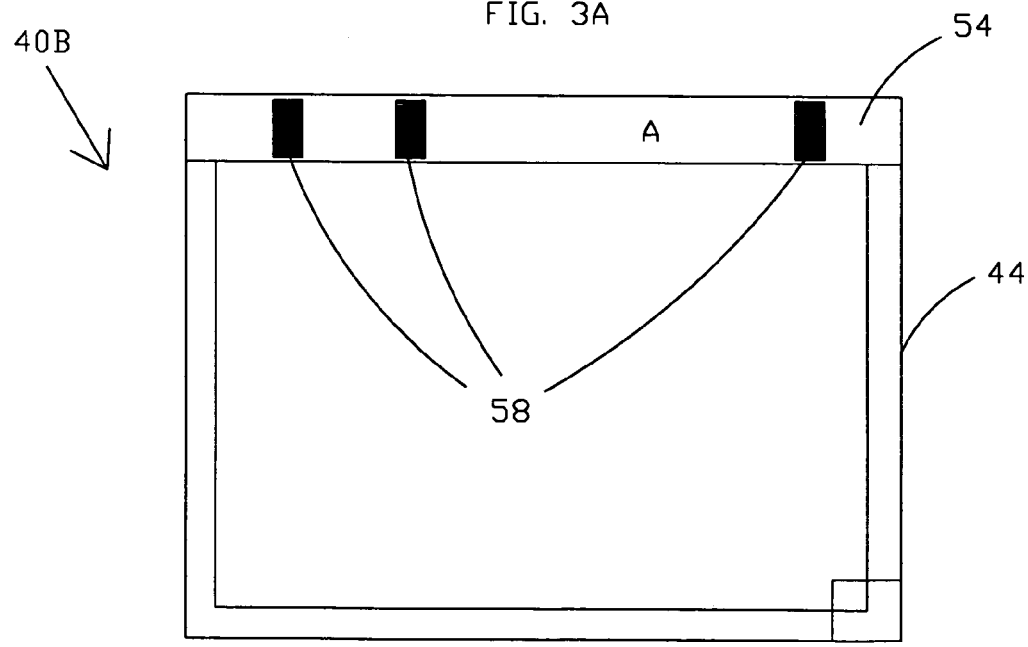
FIG. 3B is an elevational diagram of another possible embodiment of an underwater hoop with adjustable buoyancy in accord with the present invention.

FIG. 3A and FIG. 3B show two possibilities for the structure of the hoops, i.e., hoop structures 40A and 40B although other possibilities are also available. For convenience, the hoops are square but could be shaped otherwise as desired. Hoop 40A and 40B each use a solid frame 42 and 44, respectively, which contain a number of hydrophones, e.g., hydrophones 46, 48, and 50. In hoops 40A and 40B, the tops of the frame, 52 and 54 respectively, may contain air volume A such that the total structure is buoyant. In hoop 40A, vent 56 allows water B to enter the volume of frame top 52 to vary the buoyancy and allow positioning of the structure at any desired depth. In hoop 40B, one or more weights 58 may be used to accomplish the same objective. Note that in hoop 40B, the positions of the weights may also be used to adjust the tilt or level of hoop 40B. The same adjustment of tilt could be achieved in hoop 40A with compartmentalized air pockets or water pockets. While the hoops are shown as square, the hoops could have an open side or be round or the like. As well, the hoops may be floats with weighted vertical lines of hydrophones hanging down therefrom with adjustable line lengths. As well, while hoops are utilized in one preferred embodiment, other support structures may also be utilized including individual floats, submersible elements, supports for multiple vertical arrays of hydrophones, or the like. The hoops may comprise means to maintain the position or general location thereof in water if desired and/or comprise distance sensors and/or comprise transmitters and the like positioned above the water for link L and/or storage processor D.

Hydrophones 46, 48, and 50 may be positioned around the solid frame as shown. As noted above, in FIG. 3A distances $D_1$, $D_2$, and $D_3$ correlate to the amplitude/magnitude of the high and low pressure spikes as the projectile passes, examples of which are shown at 16 and 28 in FIG. 1. Because the amplitudes correlate to this offset, distance resolution of projectile position can be determined at T, the point where projectile 32 passes through the z-y plane of hoop 40A. Other waveform related attributes such as particular wave shapes, ranges of frequencies, spectrums, magnitudes of particular frequencies, or the like may also be utilized in conjunction with determination of distances $D_1$, $D_2$, and $D_3$ and/or the time at which the projectory passes the y-z plane of each hoop or arrangement of hydrophones.

In operation, an underwater projectile operating at above or below sonic speeds can be tracked as it travels through a series of hoops by measurement of signals produced by acoustic receivers. The hoops can be sized to allow for a great variation in the trajectories anticipated and even provide some tracking ability if the projectile does not travel within the rings. The change in pressure due to the passing high speed projectile produces a distinctive signal which is easily processed. The hoops can be positioned at the surface or at selectable depths below the surface.

Accordingly, the present invention provides the ability to acoustically track the trajectory of near sonic or supersonic speed underwater objects using rings of three or more omni receivers. The present invention provides means to set up an adjustable, temporary, permanent, and/or relatively easily transportable tracking range, even if the rings are large, e.g. 100 feet or greater in diameter. The buoyancy controls permit operation of the tracking range at a selectable depth below the surface level. The system operates independently of range sound velocity profiles and operates at near real time. The system provides testing capability in a broad range of environmental conditions as well as the ability to test in the presence of ship traffic. The ability to track sonic and supersonic objects is available on the same range. The signal processing requirements are not extensive providing a shorter turn around between test events and data analysis.

Many additional changes in the details, components, steps, algorithms, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A system for tracking an underwater object comprising:
   a plurality of support structures suitable to be positioned in water and aligned with a roughly projected trajectory of said underwater object wherein said plurality of support structures each comprises a buoyancy adjustment mechanism to permit vertical positioning in said water;
   a plurality of acoustic receivers carried by each of said plurality of support structures;
   a data flow path for transferring data produced by said plurality of acoustic receivers; and
   at least one processor operable for utilizing said data produced by said plurality of acoustic receivers to determine said trajectory of said underwater object.

2. The system of claim 1 wherein said buoyancy adjustment mechanism further comprises a tilt adjustment for each respective structure.

3. A system for tracking an underwater object comprising:
   a plurality of support structures suitable to be positioned in water and aligned with a roughly projected trajectory of said underwater object wherein said plurality of support structures comprise a plurality of hoops and wherein each of said plurality of hoops further has a diameter in the range of from ten to one hundred feet;
   a plurality of acoustic receivers carried by each of said plurality of support structures;
   a data flow path for transferring data produced by said plurality of acoustic receivers; and
   at least one processor operable for utilizing said data produced by said plurality of acoustic receivers to determine said trajectory of said underwater object.

4. The system of claim 3 wherein said at least one processor is operable for detecting an acoustic signal characteristic to determine a time at which said underwater object passes through a plane of each of said plurality of hoops.

5. The system of claim 4 wherein said at least one processor is operable for measuring an amplitude of data produced by said plurality of acoustic receivers to determine an x-y position of said underwater object as said underwater object passes through said plane of each of said plurality of hoops.

6. The system of claim 1 wherein said acoustic receivers comprise omnidirectional hydrophones.

7. A method for detecting velocity and trajectory of an underwater object comprising:
   supporting a plurality of hydrophones in water at a plurality of depths, said plurality of hydrophones being arranged in said water so as to extend along at least a portion of an anticipated path of said underwater object;
   selectively adjusting said plurality of depths of said plurality of hydrophones in said water;
   receiving acoustic signal data from said plurality of hydrophones as said underwater object passes said plurality of hydrophones; and
   utilizing received acoustic signal data to determine said velocity and trajectory of said underwater object.

8. The method of claim 7 further comprising utilizing an amplitude of said received acoustic signal data to determine a relative distance between said trajectory of said underwater object and said plurality of hydrophones.

9. The method of claim 8 further comprising selecting portions of said acoustic signal data to determine a time at which said underwater object passed each of said plurality of hydrophones.

10. The method of claim 9 further comprising utilizing omnidirectional hydrophones for said plurality of hydrophones.

11. The method of claim 7 further comprising providing a plurality of structures to support said plurality of hydrophones.

12. The method of claim 11 further comprising varying a buoyancy of said plurality of structures.

* * * * *